US008269787B2

(12) United States Patent
Bogart et al.

(10) Patent No.: US 8,269,787 B2
(45) Date of Patent: *Sep. 18, 2012

(54) METHODS AND APPARATUS FOR COLOR GRADING WITH GAMUT MATCH PREVIEW

(75) Inventors: Rod Bogart, San Rafael, CA (US); Rick Sayre, Kensington, CA (US)

(73) Assignee: Pixar, Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/107,859

(22) Filed: May 13, 2011

(65) Prior Publication Data

US 2011/0249018 A1 Oct. 13, 2011

Related U.S. Application Data

(63) Continuation of application No. 11/957,189, filed on Dec. 14, 2007, now Pat. No. 7,978,203.

(60) Provisional application No. 60/870,548, filed on Dec. 18, 2006.

(51) Int. Cl.
*G09G 5/00* (2006.01)
*G09G 5/02* (2006.01)
*H04N 5/46* (2006.01)
*G03F 3/08* (2006.01)
*G06K 9/00* (2006.01)
*G06K 9/36* (2006.01)
*G06K 9/40* (2006.01)
*H04N 5/202* (2006.01)
*H04N 5/14* (2006.01)
*H04N 11/16* (2006.01)

(52) U.S. Cl. ........ 345/590; 345/581; 345/591; 345/619; 345/589; 348/254; 348/488; 348/557; 348/671; 358/518; 358/519; 358/461; 382/162; 382/167; 382/254; 382/274

(58) Field of Classification Search .................. None
See application file for complete search history.

(56) References Cited

U.S. PATENT DOCUMENTS 5,416,890 A * 5/1995 Beretta ..................... 345/590
(Continued)

OTHER PUBLICATIONS

Non-Final Office Action for U.S. Appl. No. 11/957,189, mailed on Oct. 20, 2010, 9 pages.

(Continued)

*Primary Examiner* — Wesner Sajous
(74) *Attorney, Agent, or Firm* — Kilpatrick Townsend & Stockton LLP; Philip H. Albert

(57) ABSTRACT

A method for color grading within a component color space associated with a display includes receiving a source image comprising a plurality of pixels, wherein each pixel is associated with a color comprising a plurality of color component values in the component color space, wherein the component color space comprises RGB, and wherein a pixel is associated with a color inside a gamut of the display but outside a gamut of a target media, receiving a color grading signal from a user, modifying the color associated with the pixel from the plurality of pixels in response to the color grading signal, to form a graded image comprising the pixel, wherein the pixel is associated with a graded color comprising a plurality of color component values, displaying the graded image on the display to the user, automatically performing a gamut remapping of the graded color associated with the pixel, to form a gamut remapped image comprising the pixel, wherein the pixel is associated with a gamut remapped color comprising a plurality of color component values, wherein at least one color component value of the graded color is substantially similar to one color component value of the gamut remapped color, and displaying the gamut remapped image on the display to the user, wherein the gamut remapped image comprises a plurality of pixels, wherein each pixel from the plurality of pixels is associated with a color within a gamut of the target media.

23 Claims, 9 Drawing Sheets

U.S. PATENT DOCUMENTS

| | | | | |
|---|---|---|---|---|
| H1506 H | * | 12/1995 | Beretta | 345/591 |
| 5,991,511 A | | 11/1999 | Granger | |
| 6,301,393 B1 | * | 10/2001 | Spaulding et al. | 382/240 |
| 6,381,361 B1 | * | 4/2002 | Silverbrook et al. | 382/162 |
| 6,724,507 B1 | | 4/2004 | Ikegami et al. | |
| 2004/0184762 A1 | | 9/2004 | DiFrancesco et al. | |
| 2004/0252884 A1 | * | 12/2004 | Foote et al. | 382/162 |
| 2006/0087517 A1 | * | 4/2006 | Mojsilovic | 345/593 |
| 2006/0274340 A1 | | 12/2006 | Yamazoe | 358/1.9 |
| 2007/0008557 A1 | * | 1/2007 | Harrington et al. | 358/1.9 |
| 2007/0008560 A1 | * | 1/2007 | Eschbach | 358/1.9 |
| 2007/0172119 A1 | * | 7/2007 | Pan et al. | 382/162 |
| 2008/0068626 A1 | * | 3/2008 | Bala et al. | 358/1.9 |
| 2008/0317336 A1 | * | 12/2008 | Mojsilovic | 382/162 |

OTHER PUBLICATIONS

Notice of Allowance for U.S. Appl. No. 11/195,189, mailed Mar. 17, 2011, 5 pages.

Non-Final Office Action for U.S. Appl. No. 12/189,963, mailed on Jun. 30, 2011, 9 pages.

* cited by examiner

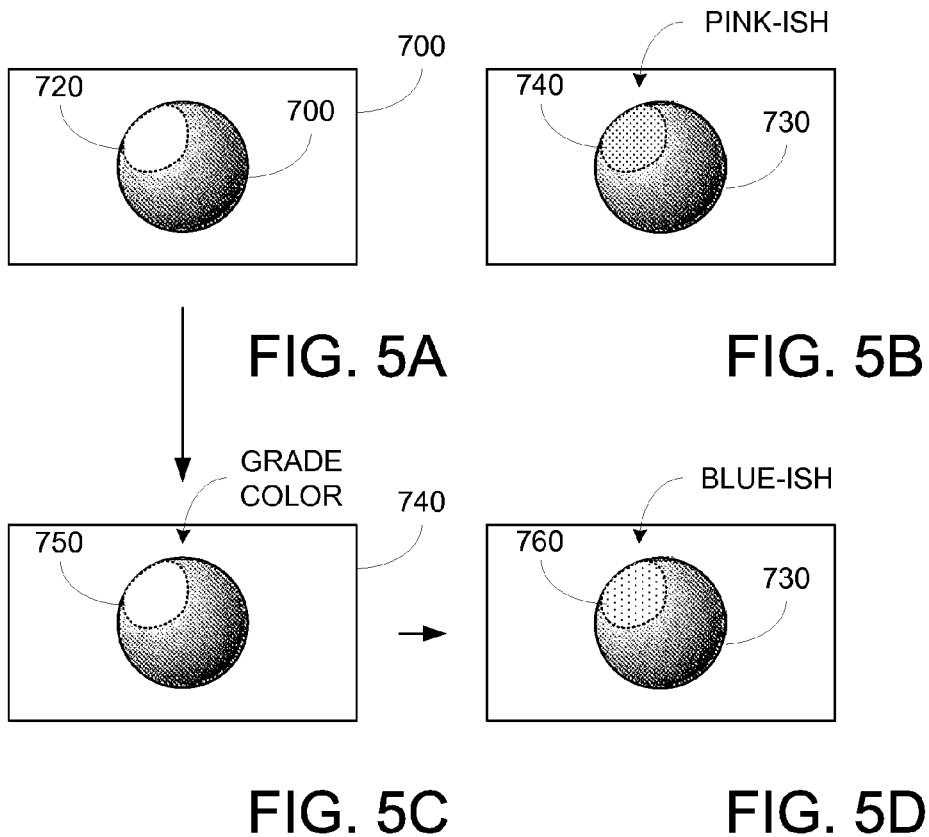
FIG. 5A  FIG. 5B
FIG. 5C  FIG. 5D
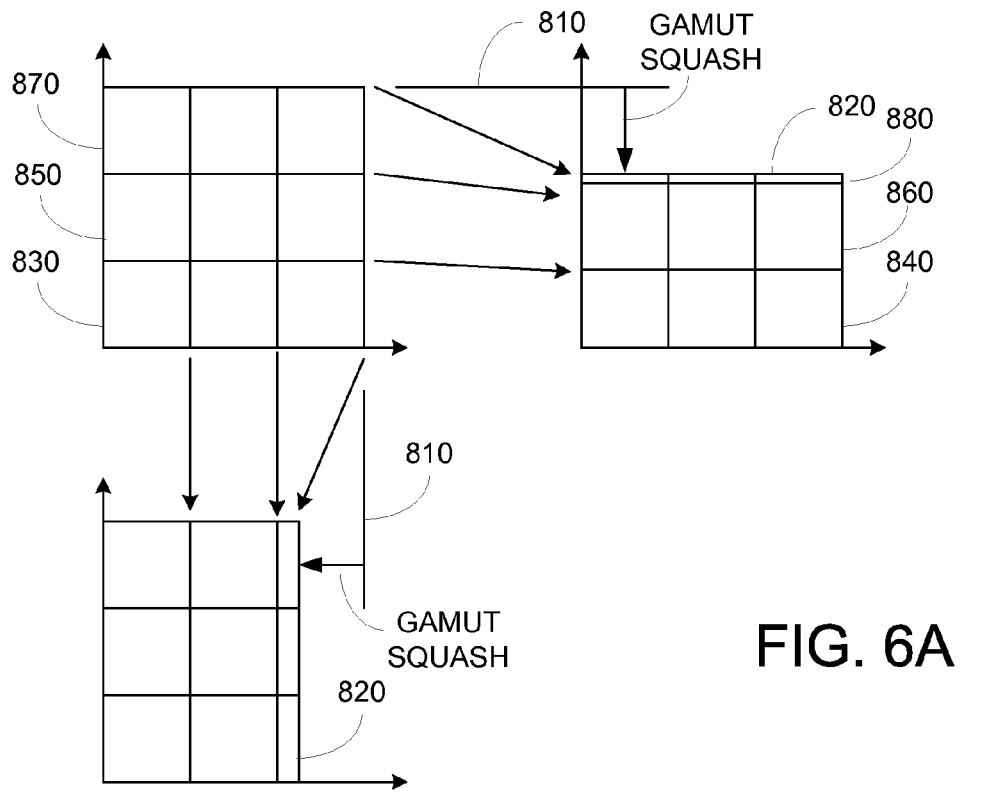
FIG. 6A

US 8,269,787 B2

METHODS AND APPARATUS FOR COLOR GRADING WITH GAMUT MATCH PREVIEW

CROSS-REFERENCES TO RELATED APPLICATIONS

The present application is a continuation of U.S. application Ser. No. 11/957,189, filed on Dec. 14, 2007 now U.S. Pat. No. 7,978,203, entitled "Methods and Apparatus for Color Grading With Gamut Match Preview," which claims priority to Provisional Application No. 60/870,548, filed Dec. 18, 2006, entitled "Methods and Apparatus for Color Grading With Gamut Match Preview"—the contents of both of which are incorporated herein by reference in their entirety for all purposes.

BACKGROUND OF THE INVENTION

The present invention relates to color grading. More specifically, the present invention relates to methods and apparatus for color grading and gamut matching of displayed images to print media (e.g., film media)

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006) and others. In addition to creating animated features, Pixar developed computing platforms specially designed for CA, and CA software now known as RenderMan®. RenderMan® was particularly well received in the animation industry and recognized with two Academy Awards®. The RenderMan® software included a "rendering engine" that "rendered" or converted geometric and/or mathematical descriptions of objects and forms a two dimensional image.

In film making, after the live-action images are shot, or after animated images are rendered, one operation typically performed on such images is known as color grading or color timing. With color grading, the colors of the image are typically modified until a certain "look" is desired. For example, a live action scene may be filmed at noon, and with color grading, a user could make the images appear as though it were night by increasing the cooler colors (e.g., blues) in the images. As another example, live action scenes may be filmed out of order throughout a day, and by performing color grading, the colors of the scenes could be adjusted until the light in the proper sequence of scenes is "correct." Additionally, color grading may be performed on animated features to produce the same results described above. Color grading of the images in a feature is typically a time-consuming and labor intensive process that requires exacting control of the colors in the images. Additionally, color grading is typically an artistic process performed by a skilled artisan known as a colorist.

After frames of a film are color graded and the Director is satisfied with the appearance of the images on the computer display, the images may be transferred onto film media for distribution into theaters, onto paper or plastic media, or the like. As discussed in the above-mentioned patent application, one issue that arises when transferring images computed and displayed on a computer display, is that the images will look different on the different types of media, e.g., film in the theater, DVDs on home theater systems, magazines, etc. Some reasons for this include that the color gamut and color reproduction of a user display and that the color gamut and color reproduction of different target media are often very different.

With regards to color reproduction (typically non-linear) response of film media, the inventors recognize that characterization is typically independent of the rendered image. For example, to characterize the color response, one or more images having ramped color densities are recorded onto film stock with a film recorder, and the resultant color densities of the film are measured. Then, based upon the known color density output and the corresponding measured color density, the color reproduction of the film media is determined.

With regards to matching colors displayed on the display to colors in the color gamut of film media, the inventors now recognize that it is desirable to limit the amount of automatic gamut matching so as to reduce unintended side effects.

Automatic approaches are typically used to map colors outside a first color gamut (out-of-gamut) to fit within a color gamut (in-gamut). Often these approaches are characterized by rendering intent. Four common automatic methods for performing the rendering intent are known as Saturation, Relative and Absolute Colorimetric, and Perceptual intents.

Automatic approaches are typically used to map colors outside a first color gamut (out-of-gamut) to fit within a color gamut (in-gamut). Often these approaches are guided by rendering intent. Four common rendering intents are known as Saturation, Relative and Absolute Colorimetric, and Perceptual intents.

For motion pictures, a problem with implementations of saturation intents, where the vividness of pure colors are desired to be preserved, is that out-of-gamut colors typically, undesirably change in hue. For example, a yellow flower may be turned into an orange flower as a result of such a color transformation. Accordingly, saturation intents approaches to out-of-gamut colors are not typically used for motion pictures (live action, or animation).

A problem with implementations of perceptual mapping intents, where all colors are remapped to in-gamut colors, is that all colors tend to change. Additionally, the dynamic range of colors is reduced. As a result, the colors of a modified image may not appear as vivid or saturated as was originally intended. Accordingly, perceptual intents approaches to out-of-gamut colors are not typically used for motion pictures (live action, or animation) as the resulting images may appear dull.

Implementations of automatic colorimetric (relative or absolute) intents are more often used in the photographic and motion picture industries. This is because with these techniques, pre-existing in-gamut colors are maintained (absolutely or relatively with respect to a defined white point), while out-of-gamut colors are pulled in-gamut. Typically, such colorimetric intents approaches move out-of-gamut colors towards the neutral axis until an in-gamut color is reached.

FIG. 1 illustrates an example of automatically moving out-of-gamut colors to in-gamut colors, independent of color grading judgments. Illustrated in FIG. 1 is a two dimensional portion of a color chart 100 of blue values plotted against green values. In this example, red values point into the page. Color chart includes a representation of a color gamut 110 for a first media (e.g., a monitor) and a representation of a color gamut 120 for a second media (e.g., film) in the color space of the monitor (RGB). Outlined in FIG. 1 are regions 130 representing colors within color gamut 110, but out-of-gamut with respect to color gamut 120. Additionally, a line 150 represents a projection of a neutral axis upon the blue/green plane. As illustrated, in the color space representation 160, the neutral axis 170 actually runs equidistant between the red, green, and blue axes, from black to white.

In the example in FIG. 1, a color 180 is within region 130, and is out-of-gamut with respect to color gamut 120. With a typical gamut remap using absolute colorimetric intents, color 180 is moved towards neutral axis 150 until an in-gamut color is obtained. In this example, the new color is indicated by color 190. As an example, color 180 has blue, green coordinates of (0.90, 0.20), and color 190 has blue green coordinates of (0.60, 0.40). Accordingly, color 180 is more much more bluish than color 190. Other colors, such as color 193 may also be moved towards the neutral axis, to color 195, as illustrated.

As can be seen in representation 160, a more accurate movement of color 180 towards neutral axis 170, also adds a red value to color 180. Thus, for example, color 180 may have red, green, blue (RGB) coordinates of (0, 0.20, 0.90), and color 190 may have RGB coordinates of (0.20, 0.40, 0.60). Accordingly, color 180 which is bluish to begin with, is remapped to color 190 that is more pinkish. Thus, even if a colorist specifies a dark blue color 180, the gamut remap process will automatically turn the dark blue into a pinkish blue.

A significant drawback to using automatic gamut matching operations is that it often ruins the painstaking color grading performed by the colorist. More specifically, as stated above, the color grading of images is a function that is typically a time and labor intensive process. Further, this process is typically performed painstakingly by a color expert/artist who determines where each color should be placed. Accordingly, using automatic gamut matching processes after a color grading process will ruin the color grading for the images. As was illustrated in FIG. 1, working within color gamut 110 of a computer monitor, the color grader may like color 180 and select its value during the color grading process. However, as a result of the automatic gamut matching process, color 180 is automatically remapped to color 190. As an example, a deep blue of color 180 (e.g., (0, 0.90, 0.20) by the color grader may be automatically moved to a pinkish blue of color 190 (e.g., (0.20, 0.60, 0.40), as a result of the automatic gamut matching. Thus as can be seen, the inventors have determined that such automatic gamut matching is disadvantageous with regards to color graded images, and that the automatic gaming matching often "fights" the intentions of the color grader.

One technique sometimes used by film makers when is limiting the gamut of a digital intermediate to the film gamut throughout the workflow. For example, the universe of colors on the digital display will be an intersection of the film gamut and the display gamut. In such a system, there is no color gamut matching problem when performing film-out, thus gamut matching is not needed when printing to film.

One drawback to such a system is that the film makers are visually restricted to working in the narrow color gamut (i.e., the intersection of the film gamut and the display gamut). Accordingly, if the film is transferred to DVD for a home theater system or projected digitally on a digital projector, the colorist will not be able to preview the grading of the resulting images. Another drawback is, there is no way to increase the color gamut of the film, without repeating the entire digital workflow. As an example, after a film is mastered for film, if the producer wanted to show their film on a digital projection system, the entire digital workflow would have to be repeated. This is because the film was not designed for the gamut of the digital projection system, which is typically wider in some respects compared to film. In such cases, to re-master for a digital projection system, special effects, live action shots, etc. would most likely have to be re-graded, to make use of the full gamut of the digital projection system.

In light of the above, what is desired are more efficient ways for performing color grading and gamut matching, without the drawbacks described above.

BRIEF SUMMARY OF THE INVENTION

The present invention relates to color grading. More specifically, the present invention relates to methods and apparatus for color grading of images and for mapping of display colors in the images that are out-of-gamut for film.

According to one aspect of the invention, a method for color grading within a component color space associated with a display is disclosed. One technique includes receiving a source image comprising a plurality of pixels, wherein each pixel is associated with a color comprising a plurality of color component values in the component color space, wherein the component color space comprises RGB, and wherein a pixel is associated with a color inside a gamut of the display but outside a gamut of a target media, and displaying the source image on the display to the user. A process may include receiving a color grading signal from a user, modifying the color associated with the pixel from the plurality of pixels in response to the color grading signal, to form a graded image comprising the pixel, wherein the pixel is associated with a graded color comprising a plurality of color component values, and displaying the graded image on the display to the user. Methods may include automatically performing a gamut remapping of the graded color associated with the pixel, to form a gamut remapped image comprising the pixel, wherein the pixel is associated with a gamut remapped color comprising a plurality of color component values, wherein at least one color component value of the graded color is substantially similar to one color component value of the gamut remapped color, and displaying the gamut remapped image on the display to the user, wherein the gamut remapped image comprises a plurality of pixels, wherein each pixel from the plurality of pixels is associated with a color within a gamut of the target media.

According to one aspect of the invention, a computer system is described embodied as described below.

According to one aspect of the invention, a user interface for a computer system including a display is described below.

According to yet another aspect of the invention, computer program product is provided on a computer-readable tangible media, such as a semiconductor media (e.g., RAM, flash memory), magnetic media (e.g., hard disk, SAN), optical media (e.g., CD, DVD, barcode), or the like that instructs a computer-system to operate as described below.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 5A-D illustrates examples according to embodiments of the present invention; and FIGS. 6A-E illustrate a visual representation of color gamuts matching according to embodiments of the present invention.

DETAILED DESCRIPTION OF THE INVENTION

Figure 2:
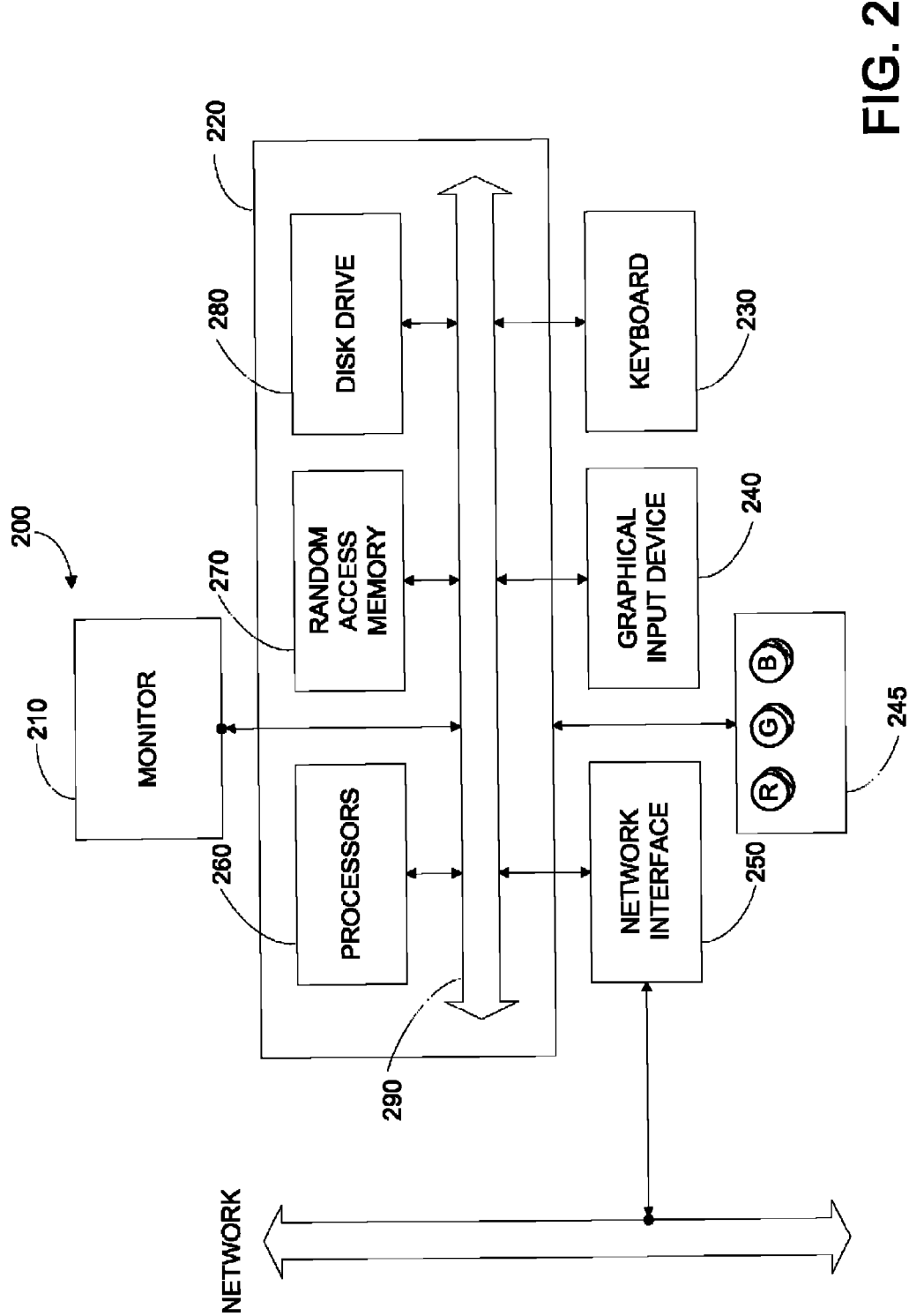
FIG. 2 is a block diagram of typical computer system according to an embodiment of the present invention.

FIG. 2 is a block diagram of typical computer system 200 according to an embodiment of the present invention.

In the present embodiment, computer system 200 typically includes a display 210, computer 220, a keyboard 230, a user input device 240, computer interfaces 250, and the like. In various embodiments, display (monitor) 210 may be embodied as a CRT display, an LCD display, a plasma display, a direct-projection or rear-projection DLP, a microdisplay, or the like. In various embodiments, display 210 may be used to visually display user interfaces, images, as described below, gamuts, or the like.

In various embodiments, user input device 240 is typically embodied as a computer mouse, a trackball, a track pad, a joystick, wireless remote, drawing tablet, voice command system, eye tracking system, and the like. User input device 240 typically allows a user to select objects, icons, text and the like that appear on the display 210 via a command such as a click of a button or the like. An additional specialized user input device 245 may also be provided in various embodiments. User input device 245 may include a series of rotating knobs, slider switches, or the like, that provides a user with control of primary color components (e.g., red, green, and blue), as will be described below. In other embodiments, user input device 245 include additional computer system displays (e.g., multiple monitors). Further user input device 245 may be implemented as one or more graphical user interfaces on such a display.

Embodiments of computer interfaces 250 typically include an Ethernet card, a modem (telephone, satellite, cable, ISDN), (asynchronous) digital subscriber line (DSL) unit, FireWire interface, USB interface, and the like. For example, computer interfaces 250 may be coupled to a computer network, to a FireWire bus, or the like. In other embodiments, computer interfaces 250 may be physically integrated on the motherboard of computer 220, may be a software program, such as soft DSL, or the like.

In various embodiments, computer 220 typically includes familiar computer components such as a processor 260, and memory storage devices, such as a random access memory (RAM) 270, disk drives 280, and system bus 290 interconnecting the above components.

In some embodiments, computer 220 includes one or more Xeon microprocessors from Intel. Further, in the present embodiment, computer 220 typically includes a UNIX—based operating system.

RAM 270 and disk drive 280 are examples of computer-readable tangible media configured to store data such as source image files, gamuts for different types of print media (e.g., film, paper, plastic, metal, etc.) models including geometrical descriptions of objects, ordered geometric descriptions of objects, procedural descriptions of models, scene descriptor files, a rendering engine, embodiments of the present invention, including executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 200 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit, GPU, may be used to accelerate various operations, described below. Such operations may include color grading, automatically performing a gamut remapping, or the like.

FIG. 2 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

Figure 3:
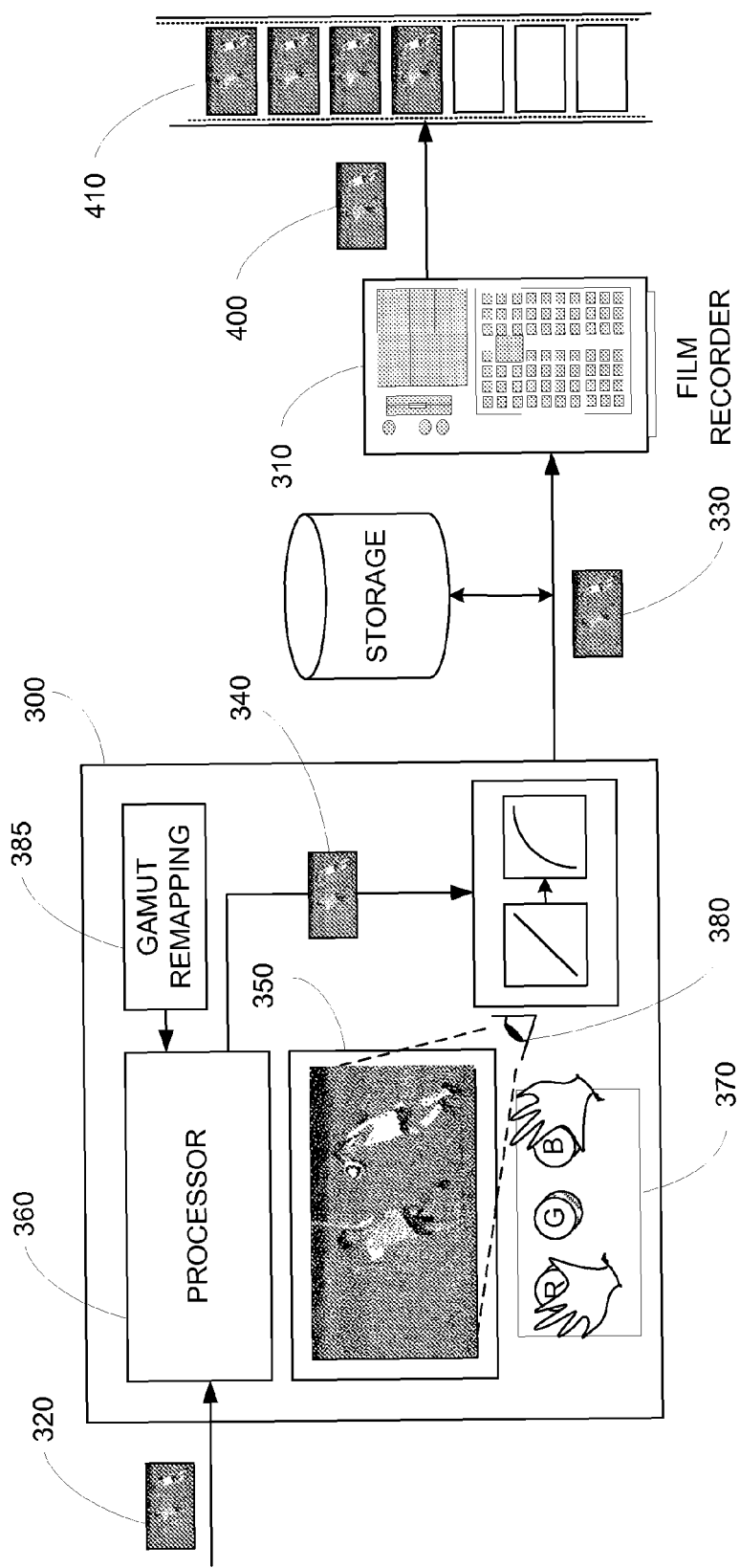
FIG. 3 illustrates block diagrams of a system according to various embodiments of the present invention.

FIG. 3 illustrates block diagrams of a system according to various embodiments of the present invention. More specifically, FIG. 3 illustrates a block diagram including a computer system 300 and a film recorder 310. An image 320 is provided to computer system 300, which outputs an image 330 to film recorder 310. In turn, film recorder 310 records image 400 to film 410. In the present example, image 320 is an image with colors in the color gamut of a display and image 330 is an image with colors in the color gamut of film 410.

In various embodiments, computer system 300 may be embodied as illustrated in FIG. 2 above, including a display 350, a processing system 360, gamut remapping data 385, and grading controls 370. In the present example, display 350 is used to display images to a user 380, such as image 320 and image 340; grading controls 370 allows user 380 to input color grading signals after viewing the images on the display; and processing system 360 is used to modify the color of the images in response to the color grading signals of user 380. As an output, image 340 is an image with colors in the color gamut of film 410.

Also illustrated in computer system 300 is a transformation block 390. In various embodiments of the present invention, the color responsiveness of film recorder 310 and 410 are characterized. For example, in response to a linear ramp of color densities, the film may record a non-linear ramp of color densities. Accordingly, the inverse of the color responsiveness of the film 395 is implemented in transformation block 390. In practice in the example above, if image 340 includes a linear ramp of color densities, image 330 would include a non-linear ramp of color densities, and image 400 would reflect the linear ramp of color densities.

In some embodiments of the present invention, transformation block 390 may implemented by processor 360 or refer to a data structure stored in dedicated look up table (LUT), in the main memory of computer 360, or the like that provides the reverse transform data.

In various embodiments of the present invention, film recorder 310 maybe any conventional film recorder, such as an Arrilaser film recorder by Arri, or the like. In some embodiments, film recorder 310 may be based upon laser illumination, and image 330 (digital data) is used to control the one or more lasers in film recorder 310. In other embodiments, other types of transfer of source image digital data to film are contemplated. For example, image 330 my drive a CRT, or the like. In other embodiments, image 330 may drive one or more illuminated LCD panels. Examples of this are disclosed in co-pending U.S. application Ser. No. 10/698,985 filed Oct. 31, 2003. This application is incorporated herein for all purposes.

In various embodiments of the present invention, film 410 is exposed to the lasers or display devices within film recorder 310. In various embodiments of the present invention, film 410 may be negative film stock or positive film stock. In some embodiments, the negative film stock may be used to form an "internegative" or any other type of negative (e.g., "master negative"), from which a "release print" may be made, via contact-printing, or the like. In cases where positive film stock may be used, a "release print" may be directly made, or an "interpositive" may be made. In various cases, the interpositive may be used to print one or more internegatives, which themselves may be used to make release prints.

In other embodiments of the present invention, film recorder 310 maybe any other type of digital to printed media transfer apparatus. For example, the transfer apparatus may print onto media such as paper media, plastic media, semiconductor media, metal media, or any other type of media which can be viewed.

Figure 4A:
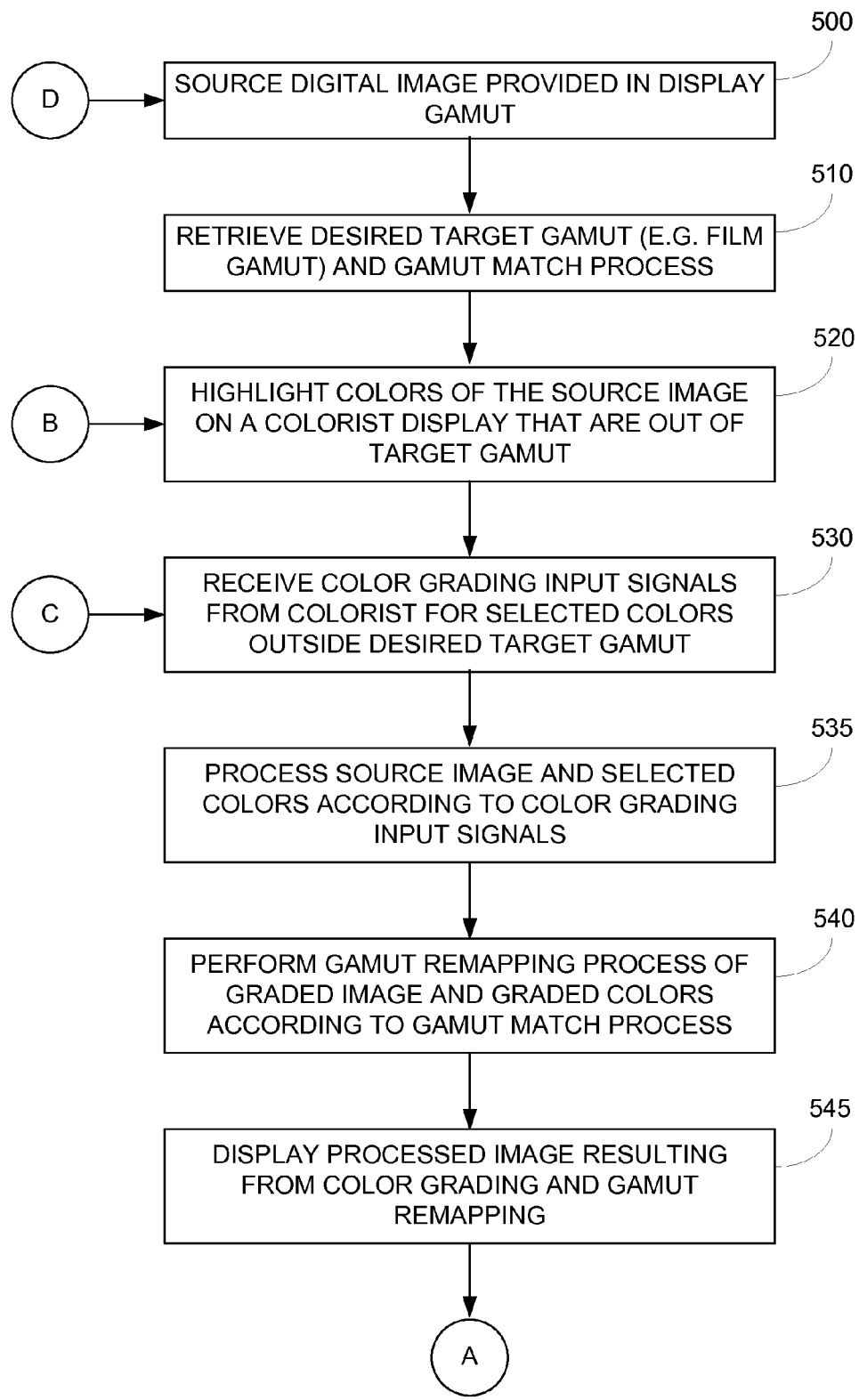
FIGS. 4A-C illustrate a flow diagram of various embodiments of the present invention.
Figure 4B:
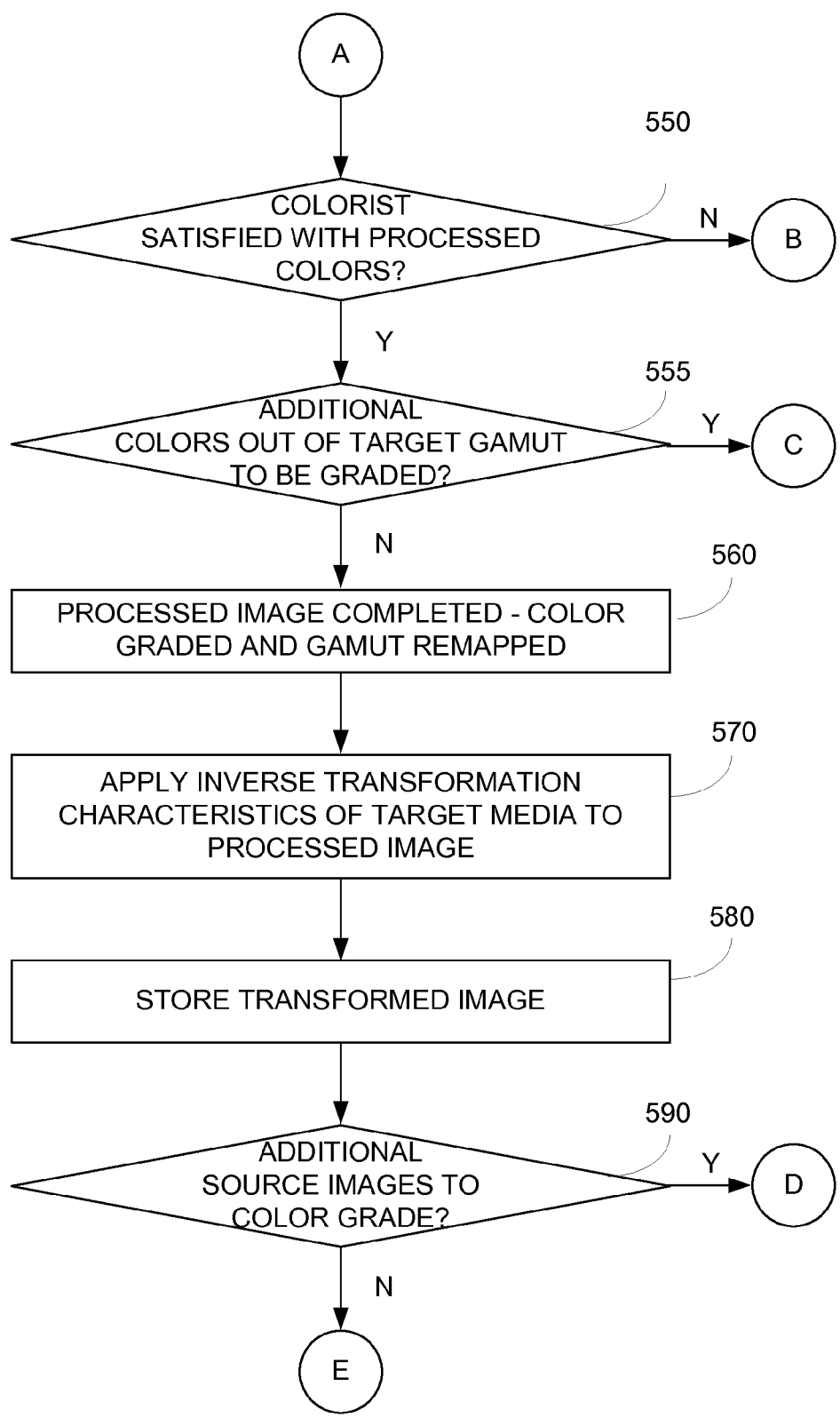
Figure 4C:
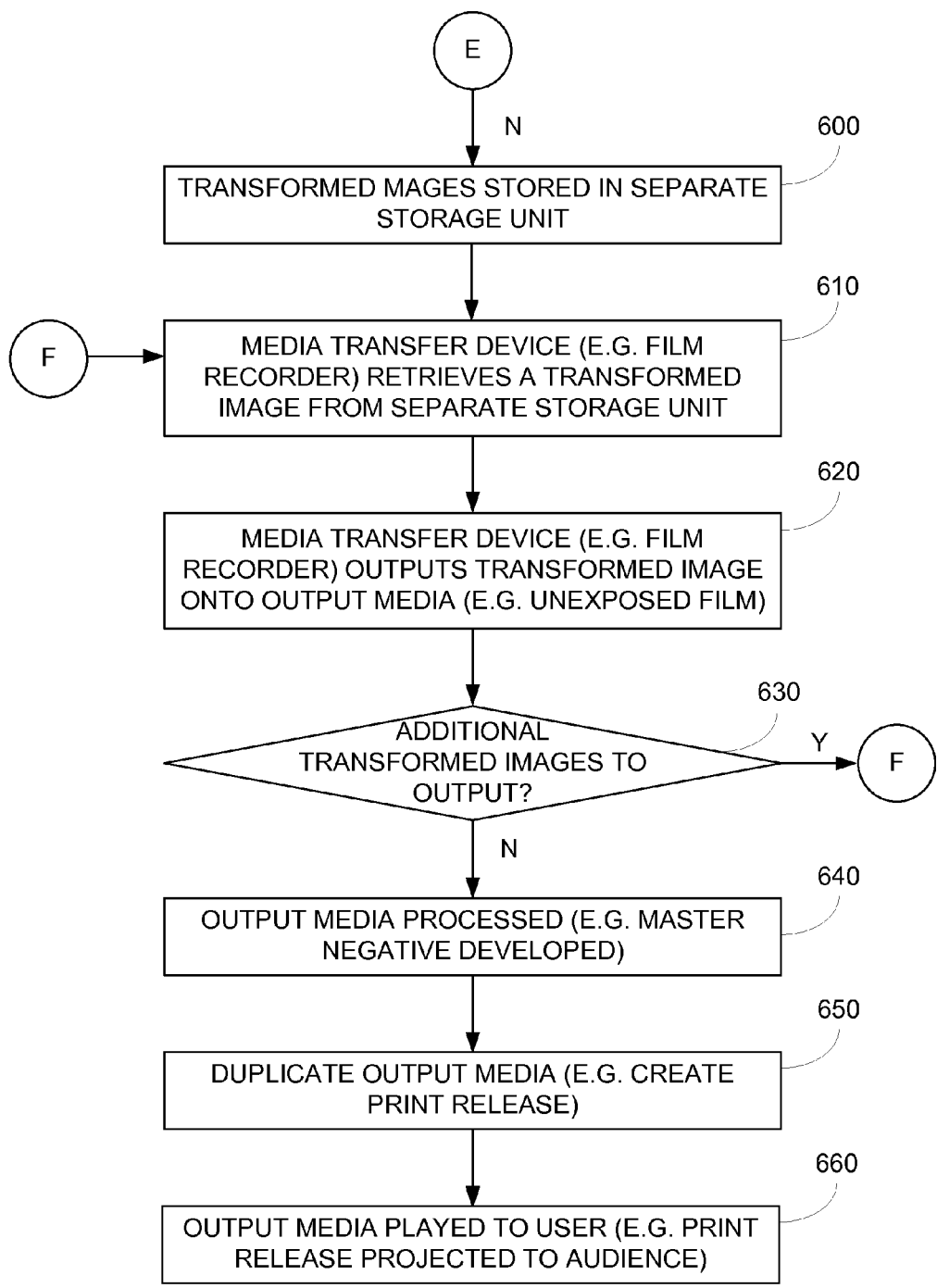

FIGS. 4A-C illustrate a flow diagram of various embodiments of the present invention. FIGS. 4A-C will be described with reference to elements in FIG. 3 for convenience.

Initially, image 320 (represented as source digital data), is provided to computer system 300, step 500. In various embodiments, image 320 may be a rendered image, as described above, a live action image (filmed by a digital video camera, filmed on film stock and digitized, or the like), a combination of rendered and live action images, or the like.

In various embodiments of the present invention, image 320 is rendered/processed within the color space of display 350. In other words, the colors within image 320 may all be within the color gamut of display 350. In some examples the color space of display 350 is tristimulus, for example: red, green, and blue (RGB), or the like; in another example, the color space of display 350 is hexchromatic, for example, red, green, blue, cyan, magenta, and yellow (RGBCMY); or the like.

Next, in FIG. 4A, the gamut mapping data 385 from the color gamut of image 350 to color gamut of image 410, is retrieved from a memory of processing system 360, step 510. In various embodiments, the color gamut may be specified by the manufacturer of film 410, or may be determined empirically. In one example, the color gamut for film 410 is stored with respect to the color space of the display gamut. Referring back to FIG. 1, for example, color gamut 120 represents a two-dimensional slice of colors reproducible by film 410, with regards to the color space of the monitor: RGB. In some examples, the color gamut of film 410 may be approximated via mathematical functions. Typically, the gamut mapping data 385, described below, may be determined a priori.

In various embodiments, image 320 is displayed on display 350 for the colorist to view, step 520. In addition, in this step, colors within image 320 that are outside the color gamut of film 410 (i.e., out-of-film-gamut) may be highlighted to the colorist. For example, pixels having out-of-film-gamut colors in image 320 may alternatively blink between the out-of-film-gamut color and another color, such as black or white. As another example, pixels having out-of-film-gamut colors may be mapped to a pre-defined color, such as yellow. Many other ways of highlighting pixels having out-of-film-gamut colors in image 320 are contemplated, for instance, in some embodiments, the out-of gamut colors are highlighted on user demand.

In subsequent steps, based upon the highlighted colors, the colorist then color grades the image, typically while observing the effects on the color graded image, and sometimes on the gamut remapped image.

More specifically, in various embodiments of the present invention, while viewing image 320 on display 350, the user selects a color or range of colors, and provides color grading input signals, step 530. One method for proving the color grading input signals is via grading controls 370. As will be described further below, grading controls 370 may provide the colorist with channel (e.g., R, G, or B) independent control for moving colors for the color grading process. In some embodiments, grading controls 370 includes a series of knobs, each of which controls a separate color component. For example, one knob may control the red color component, one knob may control the blue color component, and one knob may control the blue color component. In other embodiments, any conventional grading methods may be used. In response to the color grading input signals, the colors of the selected colors are modified, step 535.

In various embodiments, as described above, while viewing the image in the display gamut, the colorist provides the color grading input signals provided to color grade image 320. As described above, the colorist modifies the colors on the image to obtain a certain "mood," to maintain proper color continuity, to change the time of day, or for any other reason. Accordingly, color grading may include color grading of colors already within the gamut of film 410 (i.e., in-film-gamut) and/or may include color grading of colors outside the gamut of film 410 (i.e., out-of-film-gamut).

Next, the gamut remap is applied to the colors of the graded image, to allow the colorist to see how the graded image will appear after the gamut remap, step 540. As discussed above, the gamut remap may change the colors of the graded image. Accordingly, the colorist views the graded image, after the image has been remapped into the film gamut, on display 350, step 545. As will be described below, embodiments of the gamut remapping process typically constrains one or more color component values within the given color space. For instance, highly saturated blue colors (e.g., 0.8) remain blue (e.g., 0.7) after gamut remap, and are not given additional red or green component values; as another example, a color with high (e.g., 0.9) green values, are decreased in green values (e.g., 0.8) without the addition of additional red or blue values.

In various embodiments, if the user is not satisfied with the colors produced as a result of the gamut remapping, step 550, the colorist can change the color grading of the image. An example of this will be described below. If there are other colors to grade, the process described above may be repeated for other colors within or outside the film gamut, step 555.

As can be seen, the colorist grades the image for color effect, as described above, and at the same time grades the image taking account of the automatic gamut remapping process. In the end, image 340 is color graded with respect to the film gamut, step 560.

Next, as illustrated, transformation block 390 typically performs a non-linear transformation of colors in image 340 to form image 330, step 570. As was described above, transformation block 390 typically performs an inverse transformation of a transformation inherently performed by film recorder 310 and film 410. By performing this inverse transformation, it is expected that by the time image 400 is recorded on film 410, image 400 will have the same color linearity (i.e., response) as image 340.

In various embodiments of the present invention, image 330 is then stored into a memory (e.g., a hard drive, a network storage, optical disk), step 580. Next, the process of color grading taking account of gamut matching, may then be repeated for other images or other scenes, until color grading of the entire feature or work or reel is completed, step 590.

After the color grading has completed, the color graded images of the work may be transferred to a separate storage, step 600. In various embodiments, the separate storage may be a removable media, such as a hard drive, optical disk, or the like; additionally the separate storage may be a network storage device, or the like. Accordingly, the color graded work may be physically or electronically transferred to a third party, e.g., film lab, or the like, or kept in-house for purposes of transfer to film.

In some embodiments of the present invention, the color graded images of the work are then retrieved from the storage, and input to film recorder 310, step 610. As mentioned above, various ways of providing the digital data of the color graded images are described including, physical transfer and electronic transfer. Next, in response to the digital data representing a color graded image, film recorder 310 transfers image 400 to film 410, step 620. As described above, various methods for outputting the image, including laser, LED, xenon illumination, and the like are contemplated in various embodiments.

As illustrated in FIGS. 4A-C, this recording process repeats, until all images of the work or reel have been transferred, step 630. Subsequently, film 410 is developed, step 640. In various embodiments, the developed film 410 represents an internegative copy (e.g., master negative) of the work or reel, from which release print candidates can be printed, step 650. Such print candidates may in-turn, be projected or displayed to other users (e.g., audience), step 660.

As can be seen from the above, the artistic color grading performed by the colorist is preserved when transferring the image from display color space to the tangible color space (e.g., film media). This is in contrast to the prior art problems illustrated in FIG. 1, where gamut matching for film-out distorts the color grading.

FIGS. 5A-D illustrates examples according to embodiments of the present invention. FIG. 5A illustrates a user display 700 of an image of a blue-colored object 710. As can be seen, a region 720 is highlighted, representing colors within the display gamut, but not within a film gamut, e.g., a bright blue region.

Figure 1:
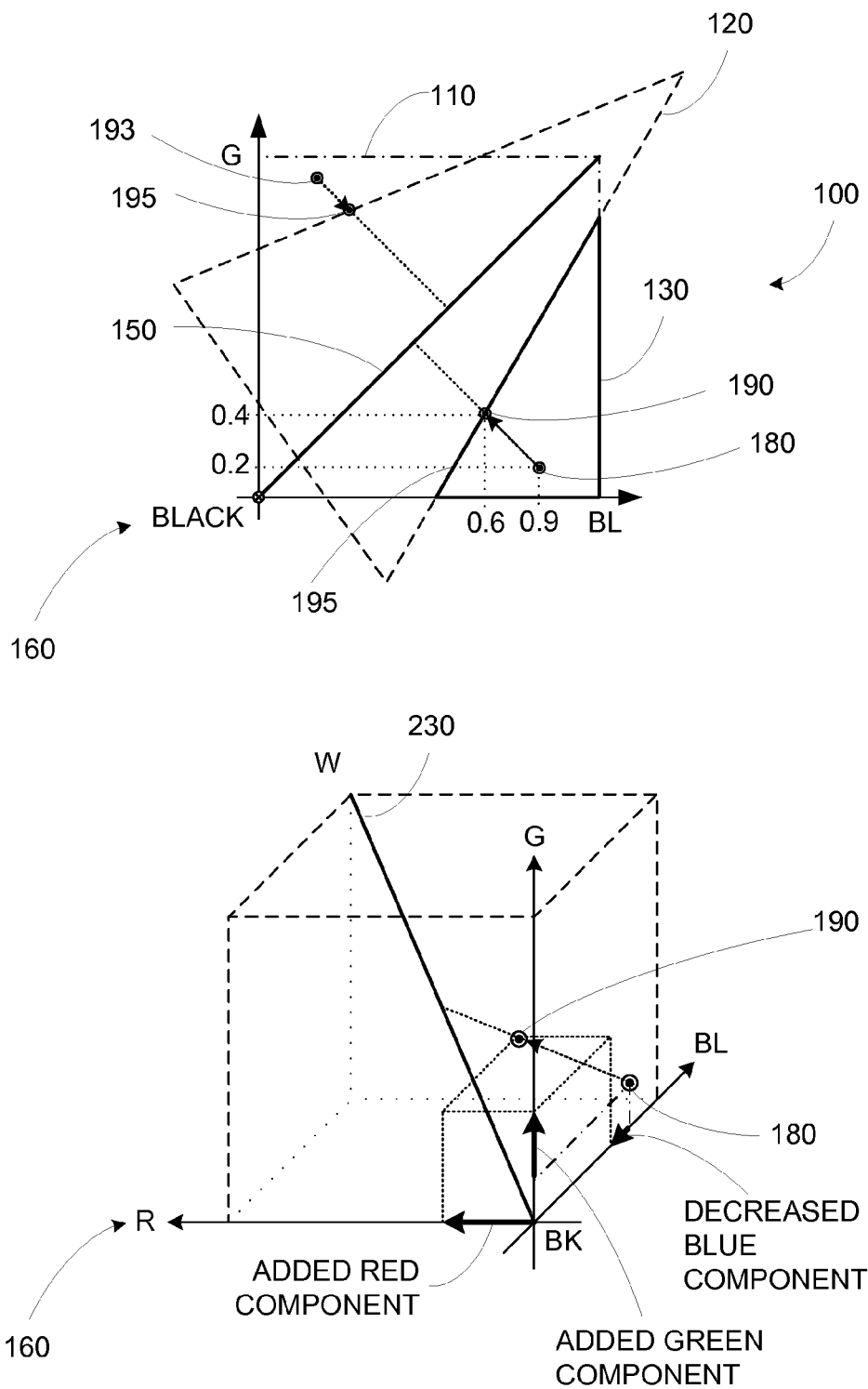
FIG. 1 illustrates an example of moving out-of-gamut colors according to an absolute colorimetric intents.

In the example in FIG. 5B, using a conventional gamut match process, the highlighted region 740 of the object 730 is gamut remapped to a pinkish color, for the reasons discussed with respect to FIG. 1. As a result, the traditional gamut matching process defeats the intents of the color grader—blue becomes pink.

In various embodiments of the present invention, FIG. 5C illustrates a typical display 740, where the colorist grades colors within region 750. Next, embodiments of the gamut matching process described above, are applied to the graded image, and the colorist views the results on display 760 in FIG. 5D. Specifically in this example, the colorist views region 770 to see if it remains the blue-color desired, or not. If not, the colorist may re-grade colors in region 720 and repeat the process.

FIGS. 6A-E illustrate a visual representation of color gamuts matching according to embodiments of the present invention.

FIG. 6A illustrates a concept according to some embodiments of the present invention. More specifically, in FIG. 6A, a two-dimensional portion 800 of a display color space is illustrated. In cases where the film color gamut 810, for example, is smaller than the display gamut 820 in a particular color component, some or all of the colors within display gamut 820 may be compressed. As illustrated, the compression may or may not be linear. In the examples shown, it can be seen that the lower 33% portion 830 of display gamut 820, may or may not be compressed, to occupy the lower 40% portion 840 of film gamut 810; the middle 33% portion 850 of display gamut 820, may be compressed to occupy the middle 20% portion 860 of film gamut 810; and the top 33% portion 850 of display gamut 820, may be compressed to occupy the top 15% portion 860 of film gamut 810. In other embodiments, as illustrated in the bottom lattice structure, the first and second portion of the gamut are not squashed, laterally, whereas the right most portion of the lattice is squashed in light of the gamut remap. In various embodiments, the ordinality of colors within the original image are preserved in the remapped image. In light of the present disclosure, one of ordinary skill in the art will recognize that may other types of compression schemes can be used in various embodiments.

Figure 6B:
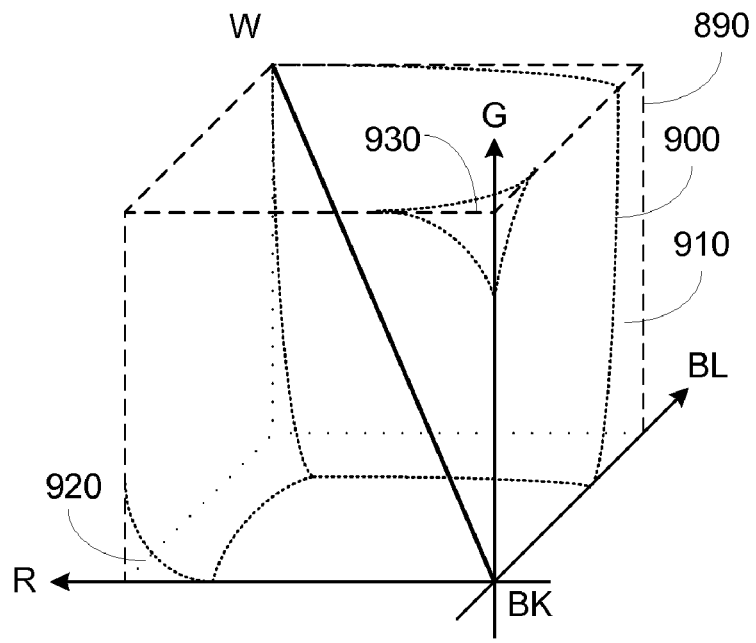

FIG. 6B illustrates one example of a display gamut 890 versus a tangible media gamut (e.g., film gamut) 900. As can be seen in this example, out-of film gamut colors include colors with large blue components, region 910; colors with large red, but small green components, regions 920; colors with large green, but small red and green components, regions 930; and the like. Examples of mapping with theses regions 910, 920, 930, will be illustrated below.

Figure 6C:
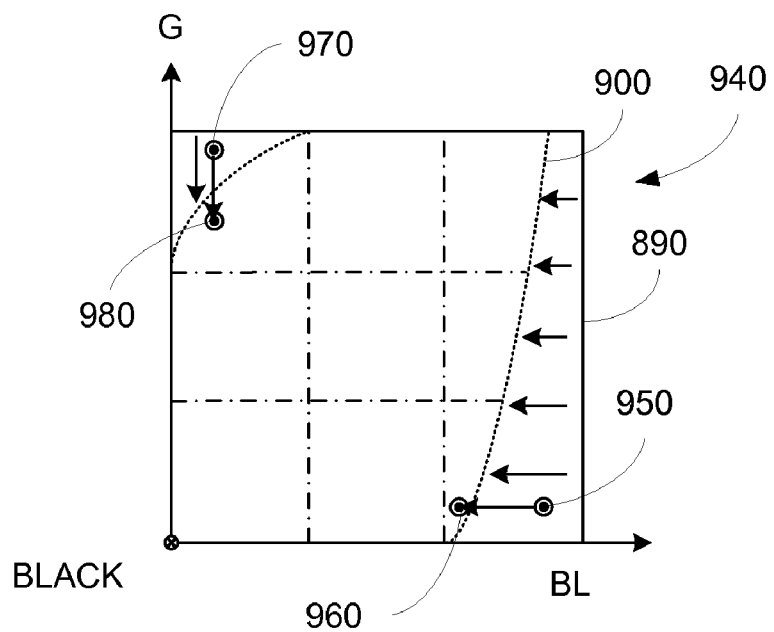

FIG. 6C illustrates a two-dimensional cross-section 940 of display gamut 890 versus film gamut 900. More specifically, cross-section 940 illustrates blue versus green components, with red held constant. It should be understood from this example, that cross-section 940 may illustrate a cross-section for virtually any value of the red color component. In this example, as can be seen, the color components of colors within the target gamut are substantially maintained. However, colors outside the target gamut are compressed.

In this example, a color 950, within display gamut 890, but not film gamut 900, represents a color that has a large blue color component value. In various embodiments of the present invention, the automatic gamut mapping, discussed in step 535, moves color 950 only with respect to one color component, to color 960. In other words, the value of only one color component is modified in some embodiments of the present invention. In this example, for example color 950 may have RGB values of {0, 0.2, 0.90}, and color 960 may have RGB values of {0, 0.2, 0.5}. As can be determined, although the amount of blue is decreased as a result of the gamut match, color 960 does not become pinkish, as color 190 did in FIG. 1, with RGB values of {0.20, 0.40, 0.60}.

In this example, a color 970, within display gamut 890, but not film gamut 900, represents a color that has a large green color component, but small blue color component. In various embodiments of the present invention, the automatic gamut mapping, discussed in step 535, moves color 970 only with respect to one color component, to color 980. In other words, the value of only the green color component is modified in various embodiments of the present invention. In this example, for example color 970 may have RGB values of {0.3, 0.8, 0.10}, and resulting gamut matched color 980 may have RGB values of {0.3, 0.7, 0.1}.

In other embodiments of the present invention, a gamut remap may modify values of two color components. For example, in the example in FIG. 6C, color 950 may be remapped to color 970. One theory for such embodiments is to approximately maintain the color component ratio between at least two color components. Thus, for example, color 970 may have RGB values of {0, 0.1, 0.5}. In still other embodiments, a gamut remap may modify values of three color components.

Figure 6D:
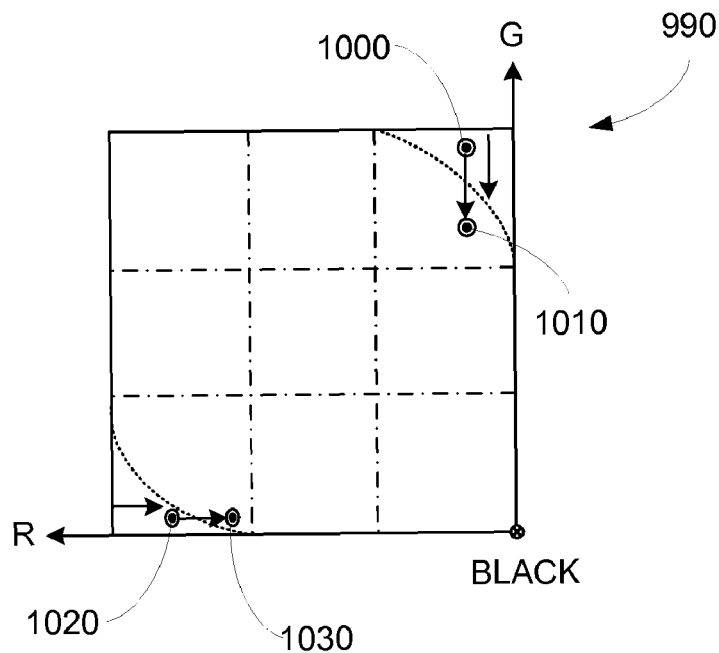

FIG. 6D illustrates a two-dimensional cross-section 990 of display gamut 890 versus film gamut 900. More specifically, cross-section 970 illustrates red versus green components, with blue held constant. It should be understood from this example, that cross-section 970 may illustrate a cross-section for virtually any value of the blue color component.

In this example, a color 1000, within display gamut 890, but not film gamut 900, represents a color that has a large green color component, but small red color component. In various embodiments of the present invention, the automatic gamut mapping, discussed in step 535, moves color 1000 only with respect to the green component, to color 1010. In this example, for example color 1000 may have RGB values of {0.2, 0.8, 0.4}, and resulting gamut matched color 1010 may have RGB values of {0.2, 0.7, 0.4}.

In this example, a color 1020, within display gamut 890, but not film gamut 900, represents a color that has a large red color component, but small green color component. In various embodiments of the present invention, the automatic gamut mapping process moves color 1020 only with respect to the green component, to color 1030. In this example, for example color 1020 may have RGB values of {0.9, 0.1, 0.4}, and resulting gamut matched color 1100 may have RGB values of {0.8, 0.1, 0.4}.

Figure 6E:
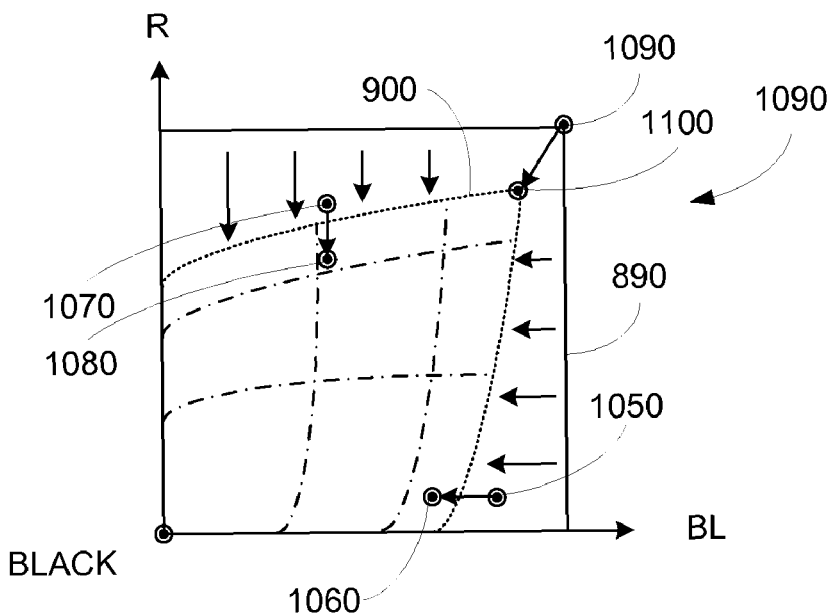

FIG. 6E illustrates a two-dimensional cross-section 1040 of display gamut 890 versus film gamut 900. More specifically, cross-section 10400 illustrates red versus blue components, with green held constant. It should be understood from this example, that cross-section 1040 may illustrate a cross-section for virtually any value of the green color component. This embodiment illustrates a case where all colors are shifted according to the target gamut. It should be understood that artistic considerations may be considered in determining whether to preserve original colors that are in-gamut of the target color space, or to remap them. FIGS. 6C and 6D show examples of not substantially shifting of such colors, and FIG. 6E shows an example of shifting of such colors. In various embodiments, combinations of these principles may be applied with respect to different pairs of color components, or the like.

In this example, a color 1050, within display gamut 890, but not film gamut 900, represents a color that has a large predominately blue color component. In various embodiments of the present invention, the automatic gamut mapping process described above moves color 1050 only with respect to the blue component, to color 1060. In this example, for example color 1050 may have RGB values of {0.6, 0.2, 0.9}, and resulting gamut matched color 1060 may have RGB values of {0.6, 0.2, 0.8}.

In this example, a color 1070, within display gamut 890, but not film gamut 900, represents a color that has a large predominately red color component. In various embodiments of the present invention, the automatic gamut mapping process described above moves color 1070 only with respect to the red component, to color 1080. In this example, for example color 1070 may have RGB values of {0.9, 0.1, 0.5}, and resulting gamut matched color 1080 may have RGB values of {0.8, 0.1, 0.5}.

In this example, a color 1090, within display gamut 890, but not film gamut 900, represents a color that has a large red and blue color components. In various embodiments of the present invention, the automatic gamut mapping process described above moves color 1070 with respect to both the red and blue components, to color 1100. In this example, for example color 1070 may have RGB values of {0.9, 0.8, 0.9}, and resulting gamut matched color 1060 may have RGB values of {0.8, 0.8, 0.8}.

In various of the above embodiments, movement of colors outside the gamut of the print media are not necessarily visually pleasing. This is in contrast to the automatic gamut matching schemes described in the background, where the goal was to obtain the most visually pleasing images. It was surprising to the inventors of the present invention that providing users (colorists) with the ability to perform less than "pleasing" color grading remappings is actually more powerful for the colorist. More specifically, providing independent color component control for gamut remapping to a colorist, actually allows better color grading control than previously allowed in systems described in FIG. 1.

Further embodiments can be envisioned to one of ordinary skill in the art after reading this disclosure. For example, other representations of color space for the display and media are contemplated, such as CMY It should be noted that color grading of out-of-film gamut colors need not be performed such that the colors are necessarily within the film gamut. Instead, grading may be performed until the colorist is pleased with the color graded image after the gamut remapping process is performed. In other words, grading repeats until the colorist is satisfied with colors of the image that will be recorded on the tangible media (e.g., film media), although the colors of the image after grading may still be outside of the film gamut.

Various embodiments described above illustrate transferring displayed images to film media, however it should be understood that embodiments may also apply to color grading of transferring displayed images onto paper, metal, glass, or the like.

In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for color grading an image within a color space associated with a display, wherein the color space comprises a plurality of color component values, the method comprising:
   a) receiving a source image comprising a first plurality of pixels, wherein a second plurality of pixels from the first plurality of pixels are associated with colors within a first gamut but outside a second gamut, and wherein the color space comprises RGB;
   b) receiving a color grading signal;
   c) determining, using a processor, a graded image by automatically modifying the colors associated with pixels from the second plurality of pixels to become modified colors in response to the color grading signal, wherein the modified colors are within the second gamut, and wherein at least one color component value of the colors of the second plurality of pixels are substantially similar to at least one color component value of the modified colors of the second plurality of pixels, wherein an order of colors in the one color component of the second plurality of pixels in the source image is preserved in the modified colors in the graded image; and
   d) storing the color grading signal in a memory.

2. The method of claim 1 further comprising:
   e) displaying the graded image to a user, wherein the graded image comprises a plurality of pixels associated with colors within the second gamut.

3. The method of claim 2, wherein b) comprises receiving the color grading signal from a user, and wherein d) comprises storing the color grading signal in the memory after repeating steps b), c), and e) until the user is satisfied with the graded image.

4. The method of claim 1 further comprising:
   retrieving the color grading signal from the memory; and
   re-determining the graded image in response to the color grading signal and the source image.

5. The method of claim 4 further comprising:
   performing a transformation of colors of a plurality of pixels in the graded image to form a transformed image having modified colors for the plurality of pixels, wherein the modified colors are adapted to drive an output device; and
   storing the transformed image to a memory.

6. The method of claim 5 further comprising:
   retrieving the transformed image from the memory; and
   driving an output device with the transformed image to record an image onto output media, wherein the transformation of the colors is associated with the media driver.

7. The method of claim 6, wherein the output device is selected from a group consisting of: a film recorder, a paper printer, a media printer.

8. The method of claim 1 wherein a pixel from the second plurality of pixels is associated with a color outside the second gamut, and wherein receiving the color grading signal comprises receiving a color grading signal for a color not associated with the pixel.

9. A method for modifying source images within an unambiguous color space associated with a display, the method comprising:
   receiving a first source image having pixels associated with colors within a source gamut but outside a desired gamut;
   retrieving a plurality of color grading signals; and
   determining, using a processor, a color graded image by modifying the colors of the pixels to form modified colors in response to the plurality of color grading signals and in response to a gamut remapping process, wherein the gamut remapping process maintains at most two color components of the colors within the unambiguous color space, and wherein the gamut remapping process preserves an order of colors within a third color component.

10. The method of claim 9 further comprising:
    receiving a plurality of source images;
    determining a plurality of color graded images in response to the plurality of color grading signals and in response to the gamut remapping process; and
    storing the plurality of color graded images.

11. The method of claim 10 further comprising:
    transforming of colors in the plurality of color graded images in response to transformed colors adapted to drive an output device; and
    storing the transformed colors.

12. The method of claim 10 further comprising driving an output device in response to the plurality of color graded images to output images onto an output media.

13. The method of claim 12, wherein the output media is selected from a group consisting of: film media, paper media, tangible media.

14. The method of claim 9, wherein the gamut remapping process maintains only one color component of the colors within the unambiguous color space.

15. The method of claim 9, wherein the unambiguous color space is Red, Green, and Blue, and wherein the two color components are selected from a group consisting of: Red and Blue, Red and Green, Blue and Green.

16. Film media including the output images determined according to the process described in claim 13.

17. A computer system for color grading an image within a color space associated with a display, wherein the color space comprises a plurality of color component values, the computer system comprising:
    a memory configured to store a source image comprising a first plurality of pixels, wherein a second plurality of pixels from the first plurality of pixels are associated with colors within a first gamut but outside a second gamut, and wherein the color space comprises RGB;
a display coupled to the memory, wherein the display is configured to display the source image, and wherein the color space is associated with the display;
a color grading input portion configured to receive a plurality of color grading signals; and
a processor coupled to the memory, display, and the color grading input portion, wherein the processor is configured to determine a plurality of graded images by automatically modifying the colors associated with pixels from the second plurality of pixels to become modified colors in response to the plurality of color grading signals, wherein the modified colors are within the second gamut, and wherein at least one color component value of the colors of the second plurality of pixels are substantially similar to at least one color component value of the modified colors of the second plurality of pixels, wherein an order of colors in the one color component of the second plurality of pixels in the source image is preserved in the modified colors in the plurality of graded images, and wherein the display is also configured to display the plurality of graded images.

18. The computer system of claim 17, wherein the display is configured to be viewable by a user, and wherein the color grading input portion configured to receive the plurality of color grading signals from the user.

19. The computer system of claim 18, wherein the memory is configured to store a color grading signal from the plurality of color grading signals.

20. A non-transitory computer-readable storage medium for a computer system comprising computer executable code for modifying source images within an unambiguous color space associated with a display, wherein the computer system includes a memory and a processor, the computer executable code comprising:

code executable by the processor to retrieve a first source image having pixels associated with colors within a source gamut but outside a desired gamut from the memory;
code executable by the processor to retrieve a plurality of color grading signals; and
code executable by the processor to determine a color graded image by modifying the colors of the pixels to form modified colors in response to the plurality of color grading signals and in response to a gamut remapping process, wherein the gamut remapping process maintains at most two color components of the colors within the unambiguous color space, and wherein the gamut remapping process preserves an order of colors within a third color component.

21. The non-transitory computer-readable storage medium of claim 20 further comprising:
code executable by the processor to retrieve a plurality of source images;
code executable by the processor to determine a plurality of color graded images in response to the plurality of color grading signals and in response to the gamut remapping process; and
code executable by the processor to store the plurality of color graded images in the memory.

22. The non-transitory computer-readable storage medium of claim 20 further comprising:
code executable by the processor to drive an output device in response to the plurality of color graded images to output images onto an output media, wherein the output media is selected from a group consisting of: film media, paper media, tangible media.

23. The non-transitory computer-readable storage medium of claim 20, wherein the gamut remapping process maintains only one color component of the colors within the unambiguous color space.

* * * * *